United States Patent
Sherwin et al.

(10) Patent No.: US 9,335,540 B2
(45) Date of Patent: May 10, 2016

(54) MEMS DEVICE WITH IMPROVED VIA SUPPORT PLANARIZATION

(71) Applicant: Texas Instruments Incorporated, Dallas, TX (US)

(72) Inventors: Lucius Marshall Sherwin, Plano, TX (US); Jose Antonio Martinez, Murphy, TX (US); Ronald Charles Roth, McKinney, TX (US); Sean Christopher O'Brien, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 141 days.

(21) Appl. No.: 14/109,529

(22) Filed: Dec. 17, 2013

(65) Prior Publication Data

US 2015/0103391 A1    Apr. 16, 2015

Related U.S. Application Data

(60) Provisional application No. 61/890,926, filed on Oct. 15, 2013.

(51) Int. Cl.
  *G02B 26/00* (2006.01)
  *G02B 26/08* (2006.01)
  *G02F 1/167* (2006.01)

(52) U.S. Cl.
  CPC ............ *G02B 26/0833* (2013.01); *G02F 1/167* (2013.01); *G02B 26/005* (2013.01); *G02F 2001/1676* (2013.01); *G02F 2001/1678* (2013.01)

(58) Field of Classification Search
  CPC .......... G02B 26/0833; G02B 26/0841; G02B 26/001; G02B 26/02; G02B 26/06
  USPC .......... 359/290–292, 295, 298, 321; 430/311, 430/319–322, 325; 438/52, 479, 611, 679, 438/685, 706; 216/2, 67, 79, 24, 101; 353/30
  See application file for complete search history.

(56) References Cited

U.S. PATENT DOCUMENTS 7,430,072 B2    9/2008  Roth et al.
2007/0242343 A1*  10/2007  Roth et al. .................... 359/291

\* cited by examiner

*Primary Examiner* — Bumsuk Won
*Assistant Examiner* — Tamara Y Washington
(74) *Attorney, Agent, or Firm* — Michael A. Davis, Jr.; Frank D. Cimino

(57) ABSTRACT

A microelectromechanical (MEMS) device has a movable member supported above a substrate on a via support. The member and via support are fabricated integrally from first and second member forming layers. A first member forming layer forms a lower part of the member and supporting structure for the via support. First and second fill layers are deposited and patterned to form a plug that fills an inner cavity opening in the via structure. The plug is planarized to a planar part of the first member forming layer, and a second member forming layer is deposited over the first member forming layer and the planarized plug to form an upper part of the member. The via support may have a cavity filled by BARC layers.

20 Claims, 6 Drawing Sheets

MEMS DEVICE WITH IMPROVED VIA SUPPORT PLANARIZATION

This application claims the benefit of Provisional Application No. 61/890,926 filed Oct. 15, 2013, the entirety of which is incorporated herein by reference.

BACKGROUND

This relates generally to microelectromechanical system (MEMS) devices and their fabrication and, in particular, to MEMS devices having planar members supported by one or more via supports above underlying structure.

In micromirror-based systems used to display images by projecting the images onto a display plane, the contrast ratio of the display system has a significant impact on the perceived quality of the system. A display system's contrast ratio can be defined as a ratio of the brightest displayable gray scale (typically, pure white) to the darkest displayable gray scale (usually, pure black). The display of pure black can often be difficult to achieve in many display systems, since it is typically not feasible to turn off a light source used to display the images when there is a need to display the pure black. Rather, light from the light source is normally redirected so that the amount of light projected onto the display plane is minimized.

A typical device that uses an array of individually positionable micromirror light modulators for forming an image is a digital micromirror device (DMD), such as a Texas Instruments DLP® micromirror device. With such devices, the image is formed by positioning respective mirrors in "ON" or "OFF" positions using a pulse-width modulation scheme determined by bit planes generated for each image frame based on imaging data received for each pixel position (e.g., 8-bit RGB data per pixel per frame). In the "ON" position, the micromirror is set to reflect incident light onto the display plane (or other display target). In the "OFF" position, the micromirror is set to reflect incident light away from the display plane. Color (chroma) for each displayed pixel is determined by relative proportions of different primary and/or secondary colors of incident light directed onto the display plane during the image frame display period (eye integration time). Intensity (lumina) for each displayed pixel is determined by the relative proportion of "ON" time vs. "OFF" time for the mirror during the same image display period (viz., total of the weighted bit-position subinterval display times for which a "1" appears for that pixel in the series of bit planes generated for that frame.) When a micromirror is in a position to reflect light away from the display plane, however, there is still a possibility that scattered light from the micromirror and its underlying support structure (hinges, hinge supports, landing pads, electrical conductors, and so forth) will reach the display plane. The scattered light that reaches the display plane can lighten the darkest displayable gray scale intensity and therefore reduce the contrast ratio of the display system.

The micromirror MEMS structure of a DMD has pixel elements in the form of mirrors supported on a via support or other underlying support structure above a substrate for movement between "ON" and "OFF" positions in response to electrostatic forces applied by associated CMOS integrated circuitry. The underlying support structure of the micromirror can be coated with an antireflective coating to help reduce light scattering. However, the micromirror must be able to reflect as much light as possible (to increase the brightness of the display system).

FIG. 1 illustrates a typical conventional micromirror structure 100 formed on a wafer along with multiple other identical micromirror structures at respective different pixel equivalent locations in an array of a DMD MEMS device. The illustrated micromirror 100 comprises a generally rectangular plate-like metallic mirror 106 centrally supported above a hinge 102 by a via support 108. The shape and size of the micromirror 100 may vary dependent upon the arrangement of the array of micromirrors in the DMD, as well as the desired density of the DMD, the fabrication process technology, and so forth. FIG. 1 shows micromirror 100 with a layer of photoresist or other sacrificial material 104 which supports the metal layers deposited for forming mirror 106 and is patterned with an opening for simultaneous formation of via support 108 by conformal deposition of the same metal layers into the patterned opening. Sacrificial layer 104 is subsequently removed in a later processing step to release the mirrors for operation.

As can be seen in FIG. 1, the conformal deposition of thin metal to provide the mirror 106 and via support 108 leaves a central indentation 112 within the reflective top surface of mirror 106. As illustrated in FIG. 2, the central indentation causes incident light rays 110 to be scattered instead of reflecting cleanly either onto or away from the display plane according to the "ON" or "Off" position set for the respective mirror. Although the surface area of via support 108 may be small compared to the surface area of the mirror 106 top surface, the amount of light scattered by indentation 112 may be sufficient to contribute to a decrease in the contrast ratio of the display system. The impact may be more pronounced with downscaling of the mirrors. Central indentation 112 may cause a portion of light incident on mirror 106 during the mirror "ON" state to be reflected away from the display plane, rather than toward it. This may limit the maximum brightness achievable in the displayed image for that pixel "ON" state. Likewise, central indentation 112 may cause a portion of light incident on mirror 106 during the mirror "OFF" state to be reflected toward the display plane, rather than away from it. This may limit the minimum brightness (maximum darkness) achievable in the displayed image.

One approach to reducing undesired scattering is to fill indentation 112 with an antireflective coating so that light striking indentation 112 will be absorbed and prevented from scattering. To apply the coating within the via indentation in light of the current trend for size downscaling may, however, require increasing the size of the via proportional to the size of the mirror. Such variations in design and processing may be incompatible with mirror operation. Moreover, the maximum achievable brightness in the "ON" condition is still reduced due to loss of the absorbed light.

Another approach is to reduce the size of via support 108. A smaller support 108 has a smaller indentation 112 and, with a smaller indentation 112, the ratio of mirror reflective surface area to indentation surface area for the same mirror size will be more, leading to a corresponding increase in the ratio of non-scattered to scattered light. Reducing via support size may, however, interfere with mechanical strength and mirror operation. Also, a smaller via opening may be harder to fill.

Another approach is to minimize the indentation by use of known semiconductor device chemical-mechanical polishing (CMP) or similar planarization techniques. The mirror structure and reflective top surface are, however, very sensitive to changes in parameters such as surface roughness and polish, film thickness and film uniformity and can be easily damaged.

Another approach to addressing the via indentation issue is described in U.S. Pat. No. 7,430,072, the entirety of which is incorporated herein by reference. This approach attempts to eliminate indentations of the reflective surface by depositing a first portion of a mirror surface over the sacrificial layer, applying a protective coating on the mirror surface, forming a cylindrical feature in the indentation by deposition and patterning of a photoresist to invert the via, and then depositing a second portion of the mirror surface over the inverted via. This cylindrical feature, commonly known as a pillar, can have a height less than its diameter. Although the described processing transfers a roughness of the pillar to a roughened area of the second layer immediately covering the via, the amount of light scattered by the roughened area is significantly less than the amount of light scattered by the eliminated indentation.

The claimed invention addresses the above issues and offers alternatives to the described approaches.

SUMMARY

A microelectromechanical (MEMS) device is provided which has a member supported above a substrate on a via support. The member and via support are fabricated integrally from first and second member forming layers. A first member forming layer forms a lower part of the member and supporting structure for the via support. First and second fill layers are deposited and patterned to form a plug that fills an inner cavity opening in the via structure. The plug is planarized to a planar part of the first member forming layer, and a second member forming layer deposited over the first member forming layer and the planarized plug forms an upper part of the member.

In a disclosed example embodiment, a method of making a MEMS device includes forming a via opening within a sacrificial support layer formed over a substrate. A first member forming layer is deposited over the sacrificial support layer, including as a liner within and partially filling the via opening. A first fill layer is deposited over the first member forming layer, including over the first member forming layer within and further partially filling the via opening. A second fill layer is deposited over the first fill layer including within the via opening, the second fill layer filling the via opening to a level above a top surface of the first member forming layer. A masking material is deposited over the second fill layer, and the masking material is patterned to form the cylindrical pillar mask covering the filled via opening and extending for a given lateral distance beyond a top of the via opening. The first and second fill layers are patterned using the pillar mask to form a raised protrusion with a given step height and lateral width at the top of the via opening. The pillar mask is removed following the patterning of the first and second fill layers. A third fill layer is deposited over the patterned first and second fill layers to fill an indentation in the raised protrusion, and an excess portion of the third fill layer is removed to leave the filled indentation planarized with a top surface of the raised protrusion. After planarizing the filled indentation with the top surface of the raised protrusion, the raised protrusion is removed to planarize a top surface of the filled via opening with the top surface of the first member forming layer. And, a second member forming layer is deposited over the first member forming layer and over the planarized top surface of the filled via opening.

In the disclosed embodiment, after depositing the second member forming layer, the first and second member forming layers may be patterned to form the member. After forming the member, the sacrificial support layer may be removed, leaving the member supported above the substrate by the lined and filled via. The MEMS device may comprise a micromirror device, and the member may comprise a mirror. The first and second member forming layers may comprise first and second metal layers. The first and second fill layers may be thermally processed at an elevated temperature prior to depositing the masking material over the second fill layer. This thermal processing is known as curing. Curing drives solvent out of the film and initiates crosslinking of the polymer chains. The resulting cured film is insoluble in most solvents, and is mechanically rigid. The first fill layer may be cured prior to depositing the second fill layer. The first and second fill layers may be cured after planarizing the top surface of the raised protrusion. The first and second fill layers may comprise layers of BARC material. The third fill layer may comprise a layer of BARC material or another readily removable material such as a photoresist. The first and second fill layers may be patterned to remove all of the second fill layer apart from the raised portion. The first and second fill layers may be patterned to leave a reduced thickness of the first fill layer over the first member forming layer apart from the raised portion. Removing the raised protrusion may include removing the reduced thickness of the first fill layer.

In a disclosed example embodiment, the MEMS device comprises a micromirror including a substrate, first and second metal layers, and first and second BARC layers, with the metal layers and BARC layers defining a mirror supported in elevated position above the substrate by a via support. The first metal layer has a planar portion configuring a lower part of the mirror and also has a depending portion configuring supporting structure of the via support. The first BARC layer is formed over the depending portion of the first metal layer and partially fills a cavity opening in the via support. The second BARC layer is formed over the first BARC layer and fills the remainder of the opening. Top surfaces of the BARC layers are planarized to the planar portion of the first metal layer. The second metal layer is formed over the planar portion and over the planarized BARC layer top surfaces and defines an upper part of the mirror.

BRIEF DESCRIPTION OF THE DRAWINGS

Example embodiments are described with reference to accompanying drawings, wherein.

DETAILED DESCRIPTION OF EXAMPLE EMBODIMENTS

FIGS. 3A-3I illustrate steps in an example improved method of fabricating a micromirror light modulator MEMS device 200 having an array of cells each comprising a movable mirror supported by one or more via support elements in spaced position above an underlying substrate. The substrate includes integrated circuit elements associated with each cell for applying electrostatic forces in response to varying data inputs to shift angular positions of the mirrors in synchronization with light incident on the array from a controllable source of illumination. The method provides an advantageous approach to eliminate via indentation for improving planarity (and thus reflection characteristics) of the light reflective surface of the mirror.

Figure 3A:
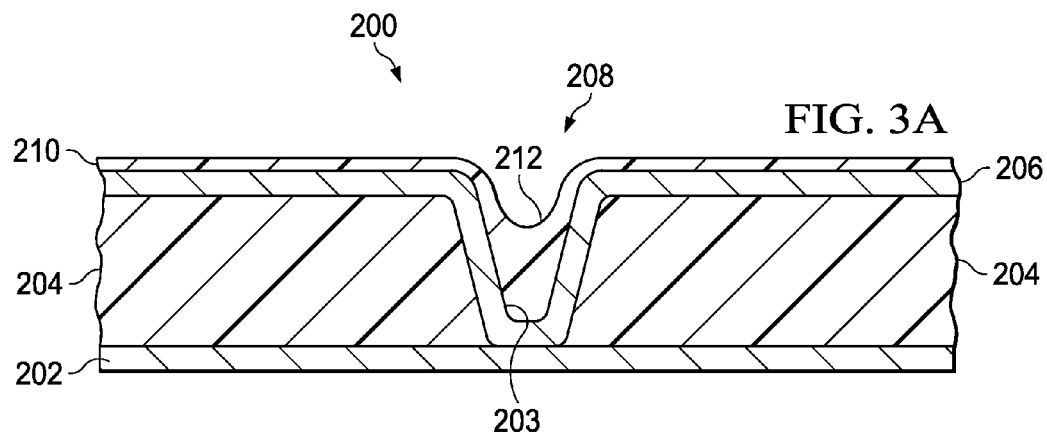
FIGS. 3A-3I are section views showing steps in an example method of making a MEMS device with improved via support planarization.

FIG. 3A illustrates deposition of one or more first layers 206 (hereafter layer) of mirror forming material over a sacrificial layer 204 of photoresist or other subsequently readily removable material which has been deposited over an underlying hinge structure 202 and patterned with one or more via openings. A single via opening 203 is shown for device 200 in FIG. 3A. Layer 206 is a thin layer deposited to uniform thickness over uninterrupted portions of a planar upper surface of sacrificial layer 204 to define the bulk portion of a correspondingly planar reflective mirror element. Layer 206 may, for example, have a thickness of between 20 and 100 nm. Deposition of layer 206 mirror forming material over the upper surface of sacrificial layer 204 simultaneously deposits the same material conformally within the via opening 203, coating the bottom and sidewalls to line and partially fill the opening 203 and define the support structure of a mirror via support 208. Layer 206 is preferably a thin layer of conductive material, such as aluminum, titanium and/or other metal, deposited in a way to ensure good coverage of the walls of the opening.

A first layer of via opening plugging material 210 is then applied conformally over the metal 206 to cover the mirror bulk portion, and to further partially fill the via opening 203 over the previously deposited first mirror forming layer 206. The material of layer 210 may be selected based on ease of use and low temperature cure characteristics, as well as for ease of subsequent removal.

A suitable material for layer 210 is an organic polymer bottom anti-reflective coating (BARC) material formulation that is free of photoactive compound, is sufficiently flowable to be applied as a thin spin-on coating, and is subsequently readily removable using an oxygen ash. Organic BARCs are easier to implement than inorganic BARCs. An example suitable choice for the material of layer 210 is a KrF-series BARC product from AZ Electronic Materials, such as AZ KrF17B (MSDS), designed for thin layer application below a photoresist for deep ultra-violet (DUV) wavelength lithography. Other example suitable choices include Shipley AR-3 and Brewer 42P anti-reflective coating materials. Using a BARC material offers advantages over using a photoresist. The BARC may be applied as a thinner coating, does not include photoactive compound, does not outgas nitrogen when heated, and leaves little etch residue. The BARC thickness may, for example, be between 20 and 200 nm.

The BARC layer 210 may be applied using a spin-on process similar to that used to apply photoresist. After deposition, layer 210 is cured at a temperature of approximately 100° C. or higher for 30 seconds or more. The thin layer 210 shown in FIG. 3A is applied to a thickness (that is, thinness) that facilitates further filling of the via opening 203 over first mirror metal 206, leaving an indentation divot 212 at the top of via opening 203 that extends below the level of and is not yet planarized with the top surface of first metal 206. The divot depth may, for example, be between 10 and 100 nm.

The relative dimensioning of the thickness of sacrificial layer 204, diameter of via opening 203 and thickness of first mirror metal layer 206 is chosen to provide sufficient coverage on the inside surfaces of opening 203 to give the mirror attachment and via support strength needed for the intended application. In general, the thickness of layer 206 chosen will leave a portion of via opening 203 unfilled, and will constitute 40-60 percent (preferably about 50 percent) of the overall end total thickness of the mirror element. As illustrated in FIG. 3A, an indentation (divot or dimple) portion 212 of opening 203 may remain unfilled after deposition of first BARC material layer 210.

Figure 3B:
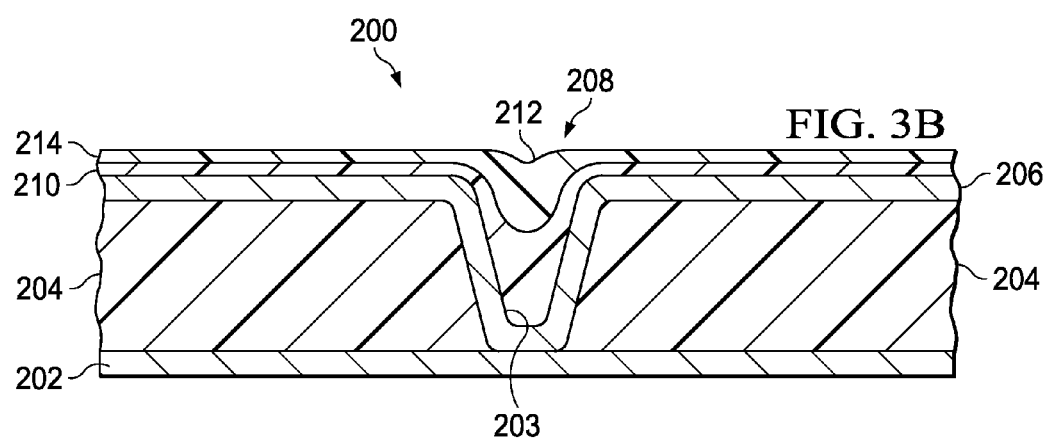

FIG. 3B shows the deposition of one or more second layers of via opening plugging material 214 conformally over the first plugging material layer 210 overlying the first metal layer 206. The one or more layers 214 (illustrated as one layer in the example) further fill the via opening 203 to bring the level of the filler up to a level above the top surface of first metal layer 210. The additional fill reduces the size of indentation 212 and raises the bottom of indentation 212 above the level of the layer 206. This increases planarization of the layers in the vicinity of the top of opening 203. The BARC thickness may, for example, be between 20 and 200 nm.

Layer 214 may advantageously also comprise a thin organic polymer BARC layer of the same or similar material as that used for first fill material layer 210. Layer 214 may be applied using a same spin-on process as used to apply layer 210, and be cured at a temperature of approximately 100° C. or higher for 30 seconds or more after deposition. Curing layer 214 after deposition also cures layer 210 again. The additional cure of layer 210 may aid in further expelling contaminants, reducing future bubble formation on metal layer 206, and reducing delamination of the various layers within via support 208.

Figure 3C:
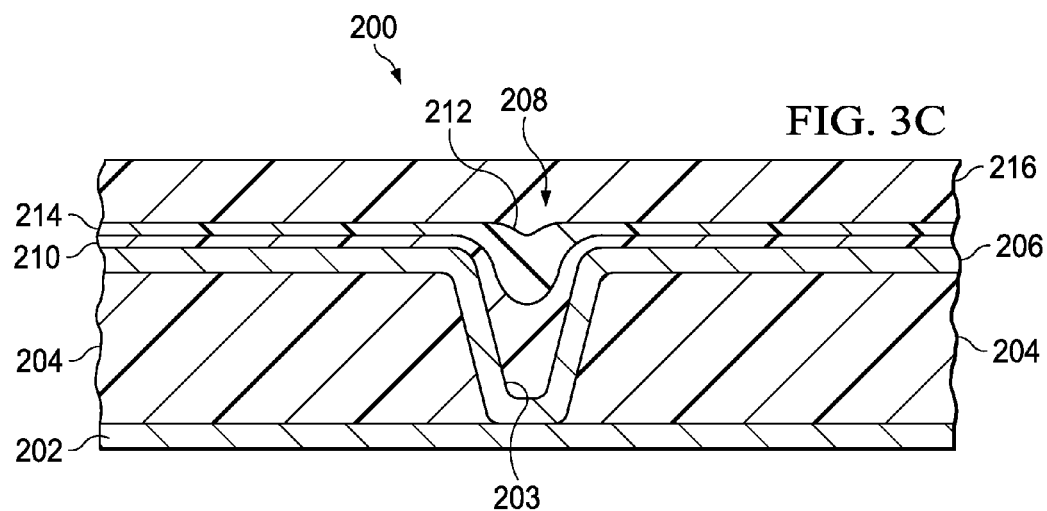
Figure 3D:
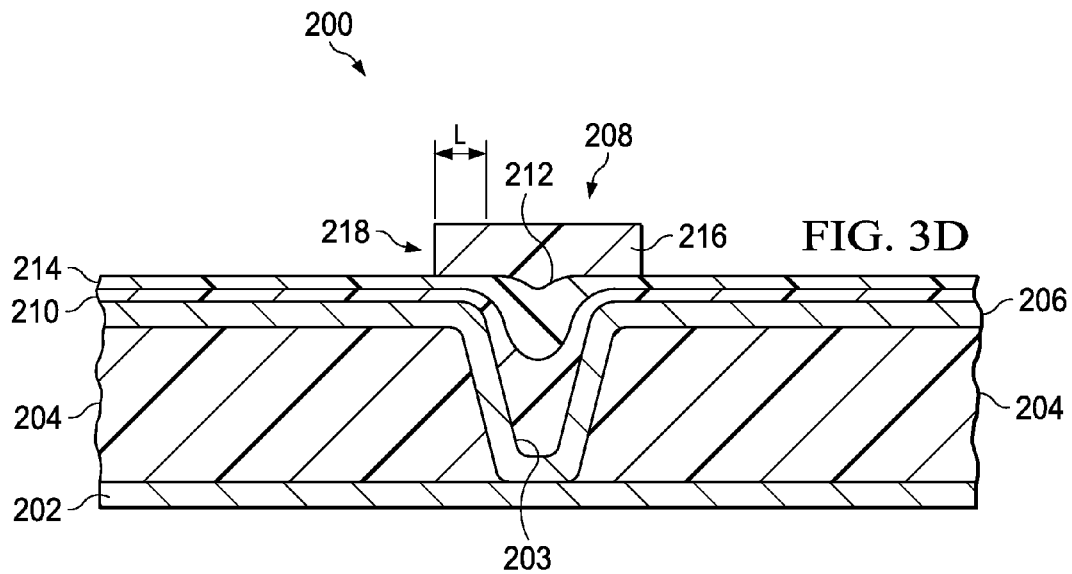

Next, as shown in FIGS. 3C and 3D, a layer 216 of photosensitive material such as a light sensitive photoresist polymer is blanket deposited over second fill material layer 214 and laterally patterned into a pillar shape over the one or more via openings 203 (one opening in given example) to provide a mask for etching and likewise laterally patterning the underlying layers 214, 210. A suitable photoresist for layer 216 may be a resist which is soluble in a common photolithography solvent composition, such as propylene glycol monomethyl ether acetate (PGMEA), when not exposed or cured. Photoresist 216 may be deposited, for example, to a thickness of approximately 0.5 μm to 2 μm, as shown in FIG. 3C. After spin coating, photoresist 216 is then patterned to create pillars 218 covering the filled via opening 203 and extending marginally circumferentially for a lateral distance L beyond the outer rim of the top of via opening 203, as shown in FIG. 3D. The lateral distance L may, for example, be between 60 and 600 nm.

Figure 3E:
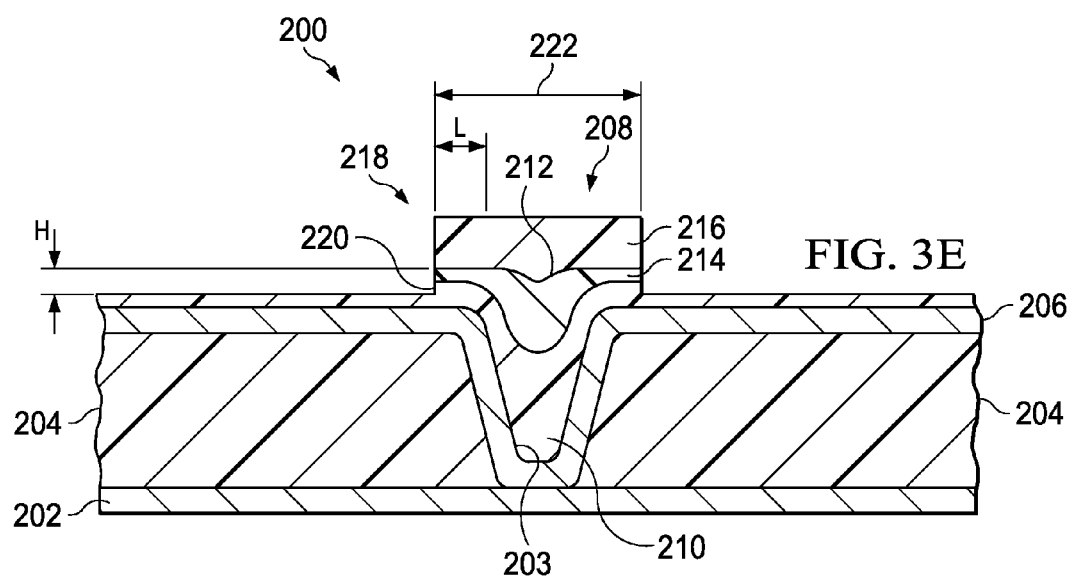

As shown in FIG. 3E, the patterned layer 216 is then used as a mask, to likewise pattern the first and second BARC layers 210, 214 to match the lateral dimension 222 including the marginal extension L of pillars 218. The etching parameters (e.g., endpoints) may be controlled to adjust the thicknesses of layers 210, 214 that remains in areas not covered by the pillar 218. In this way, a step 220 of height H may be established between the top of second fill material layer 214 covered by pillar 218 and the top of any remaining first and second fill material layers 210, 214 not covered by pillar 218. The height H of step 220 and lateral extension L of pillar 218 may be adjusted to control the subsequent removal of unwanted portions of fill material extending above the planar top surface of first mirror metal layer 206 after removal of pillar 218, as discussed further below. The step height may, for example, vary from 10 nm up to the entire thickness of layers 210 plus 214.

In the example shown in FIG. 3E, layer 214 is etched completely from over layer 210 where not covered by pillar 218. Thus, the bulk of layer 214 is removed, leaving portions remaining only over the top and marginally surrounding regions of via opening 203. The etching is then continued (in same or different steps) using the same pillar mask, until a controlled amount of the thickness of first layer 210 is also removed. This leaves all of layer 210 under the pillar 218 remaining and reduces the thickness of layer 210 elsewhere. In this case, height H is defined by the etched total thickness of layer 214 and the etched removed partial thickness of layer 210. After patterning second BARC layer 214 and any height adjust portion of first BARC layer 210, the pillar resist layer 216 is removed. This may be done, for example, by wet stripping the resist in PGMEA, leaving the patterned layers 210, 214 remaining.

Portions of layers 210, 214 above the mirror first metal layer 206 may now be removed to leave via support 208 filled to a level generally planarized with the planar top surface of first metal layer 206. The relative sharpness of the vertical edges of the patterned layers 210, 214 may, however, cause defects forming around the edges, so additional processing is preferably conducted first.

Figure 3F:
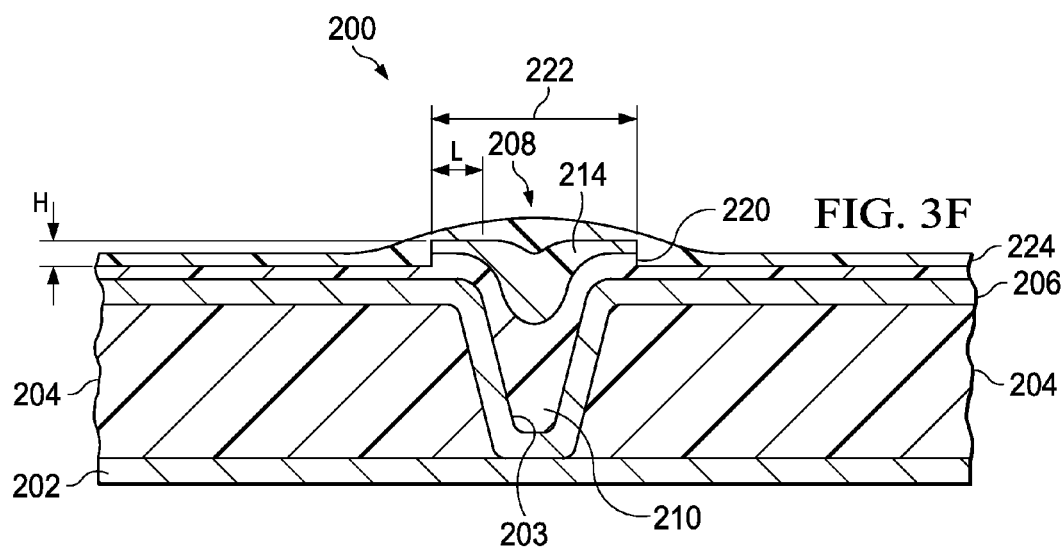

As shown in FIG. 3F, additional processing may include depositing a second sacrificial layer 224 over the raised patterned portions of first and second fill layers 210, 214 over opening 203 and over the reduced thickness of first fill layer 210 elsewhere. Layer 224 may be a BARC material similar to the material of first and second BARC fill layers 210, 214 applied in a spin-on process to achieve at least a minimum thickness sufficient to fill any remaining indentation 212 and to dull the edges of the raised step patterned portions of layers 210, 214. Alternatively, layer 224 may be a low viscosity resist material, such as a low viscosity I-line or deep ultraviolet (DUV) resist, or may be any other suitable sacrificial material that enables the formation of a uniformly thin, minimum thickness mound layer to serve the same indentation filling and sharp vertical edge dulling function. Layer 224 is not cured and not developed, thereby enabling its ready removal by a convenient etch solvent such as PGMEA. The thickness of layer 224 may, for example, be between 20 and 200 nm.

Figure 3G:
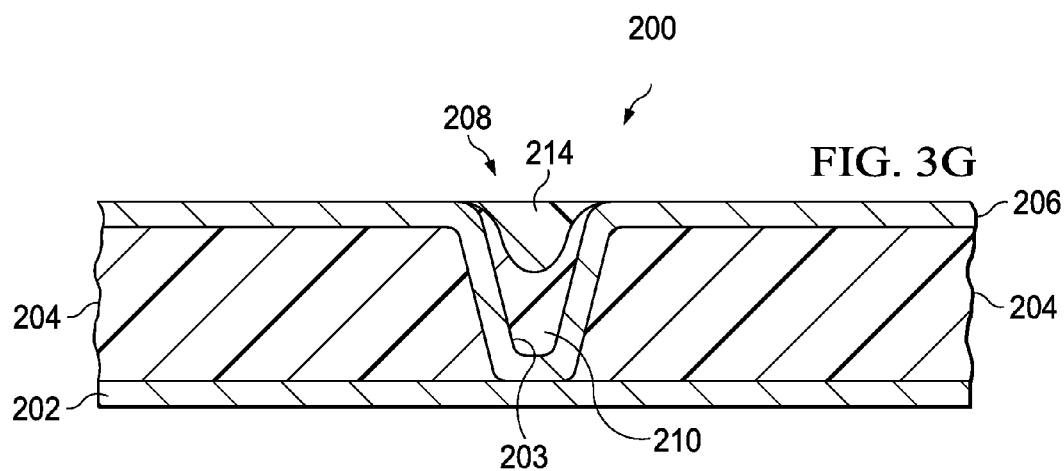

After the described top surface planarization or similar additional processing, the raised patterned portions of fill layers 210, 214 over opening 203, as well as remaining thinned portions of layer 214 elsewhere, are now removed down to planarity with the top surface of mirror first metal layer 206, as shown in FIG. 3G. This may be accomplished with an ashing operation, wherein the wafer is put in an ash chamber and exposed to strongly oxidizing conditions. The ash can be set to clear the plug protrusion in a top down manner or, alternatively, simultaneously from top and side. For a top down clearing, extension dimension L may be set greater than step height dimension H. For a simultaneous clearing, extension dimension L may be set equal to step height dimension H. A suitable etchback process uses a timed plasma enhanced oxygen etch conducted in a Mattson Technology or Lam Research etcher. The dimensions L and H and etch parameters are set to provide two endpoints. A first endpoint when the ashing removes the thinned portions of layer 214 to expose the reflective top surface of mirror first metal layer 206, and a second overetch endpoint when the raised plug portion is removed down to the dimensions of the via opening diameter (extension L removed) down to be equal with the level of the first metal layer 206 top surface.

Figure 3H:
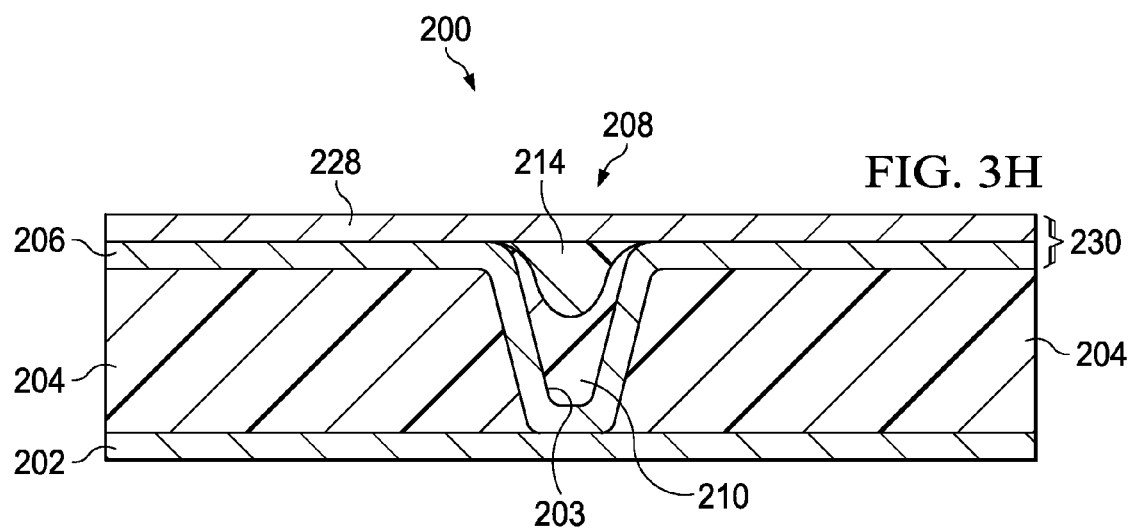

After the etchback planarization, the via opening plug fill layers 210, 214 may then again be cured, after which one or more second layers 228 (hereafter layer) of mirror forming material are deposited over the now reexposed first layer 206 of mirror forming material. As with layer 206, layer 228 is preferably a thin layer of conductive material, such as aluminum, titanium and/or other metal, deposited in a way to ensure good adhesion over the top surfaces of first layer 206 and the BARC material of portions of layers 210, 214 remaining in the planarized plug. The deposition of a second metal layer 228 over the first metal layer 206 and the planarized plug is illustrated in FIG. 3H. For the illustrated DMD mirror MEMS structure, the thickness of layer 228 may be 60 to 40 percent of the overall thickness of the mirror element layer stack 230, with a preferred thickness being about 50 percent (the other 50 percent being constituted by layer 206). The number and composition of the layers of the stack 230 may, however, be varied to suit individual needs and preferences, as well as to accommodate other types of MEMS structures.

The foregoing steps are typically undertaken on a wafer level scale, with multiple instances of the illustrated structures simultaneously formed to define arrays of such structures formed at respective die areas of corresponding multiple simultaneously formed DMDs.

Figure 3I:
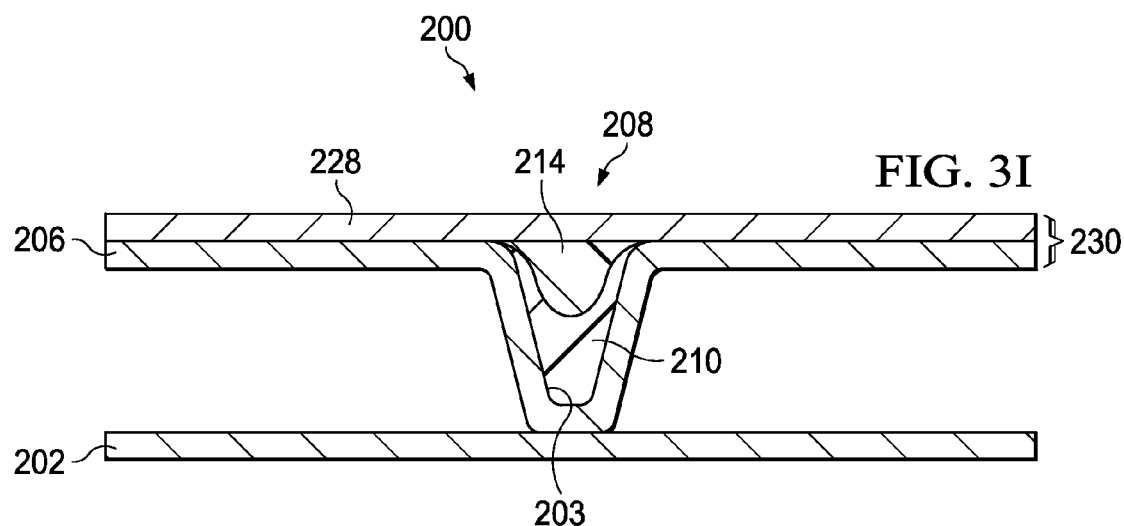

In a common processing flow, a patterning operation may next be performed to define the lateral dimensions of the mirrors comprising the deposited mirror layers. Thereafter, at an appropriate time prior to packaging of the individual die, the first sacrificial layer 204 is removed as shown in FIG. 3I, to release the mirrors for mechanical operation—in this case, for tilting between DMD pixel "ON" and "OFF" positions about via support 208.

The result is a micromirror MEMS device 200 wherein first and second metal layers 206, 228 and first and second BARC layers 210, 214 together define a mirror supported in elevated position above a substrate by an integral via support 208. The first metal layer 206 has a planar portion configuring a lower part of the mirror and also has a depending portion configuring supporting structure of the via support 208. The first BARC layer 210 is formed over the depending portion of the first metal layer 206 and partially fills a cavity opening 203 in the via support 208. The second BARC layer 214 is formed over the first BARC layer 210 and fills the remainder of the opening 208. Top surfaces of the BARC layers 210, 214 are planarized to the planar portion of the first metal layer 206. The second metal layer 208 is formed over the planar portion and over the planarized BARC layer top surfaces to define an upper part of the mirror.

Figure 1:
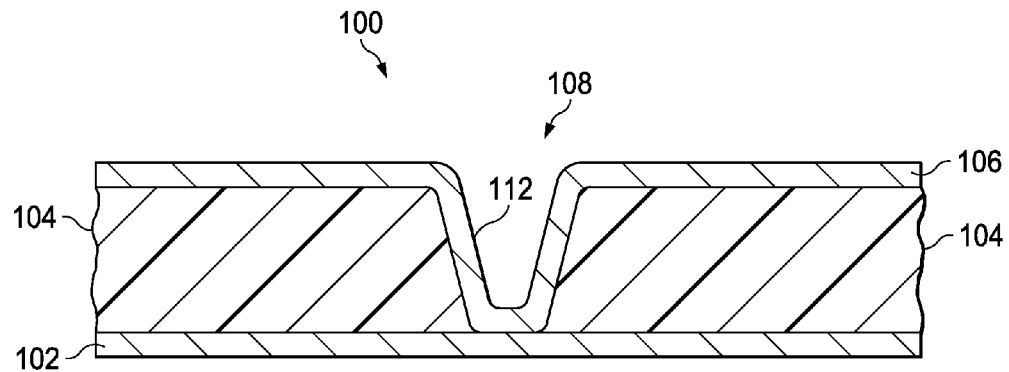
FIG. 1 (Prior Art) is a section view of a conventional DMD MEMS device having a planar mirror member supported by a via support for mechanical movement relative to an underlying substrate.
Figure 2:
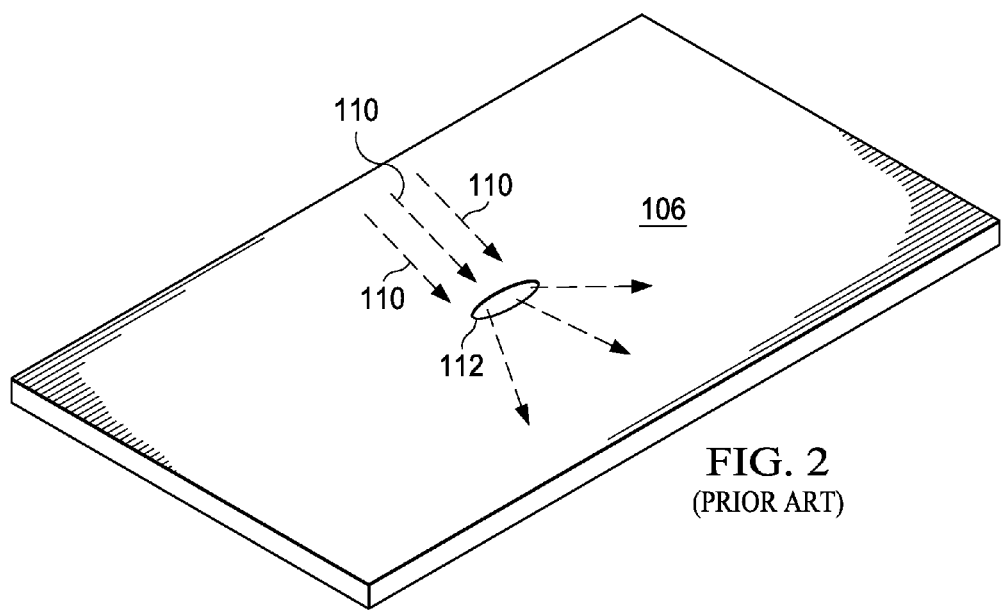
FIG. 2 (Prior Art) is a schematic view showing scattering of incident light by an opening in the via support of FIG. 1.
Figure 4:
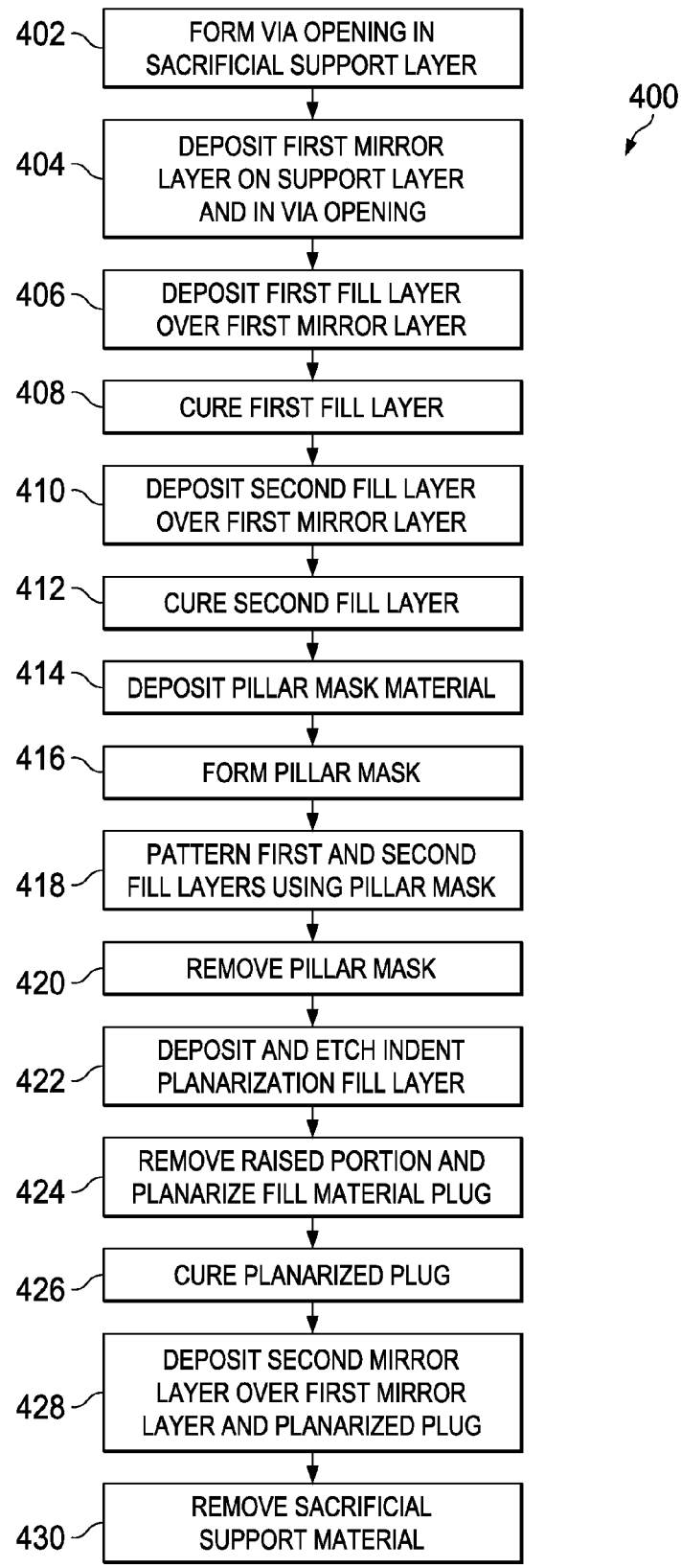
FIG. 4 is a flow chart showing a flow of steps in the example method.

FIG. 4 illustrates a sequence of events 400 in the fabrication of a MEMS device, such as the above described method for the fabrication of micromirror device 200, that addresses issues with the indentation 112 left with formation of via support 108 described previously in connection with fabrication of the micromirror 100 shown in FIG. 1. The indentation 112 results from deposition of mirror material 106 within a patterned via opening and over the remaining top surface of sacrificial layer 104 for simultaneous formation of the mirror supporting structure along with the formation of the mirror itself.

After deposition of a sacrificial support layer, one or more via openings are formed in the support layer at block 402. This is illustrated in the above example in FIG. 3A which shows a via opening 203 formed in the sacrificial material layer 204. At block 404, one or more first layers of an elevated mirror member forming material are then deposited over the support layer, including as a liner within and partially filling the via opening. This is illustrated in FIG. 3A which shows a mirror first metal layer 206 deposited within via opening 203 and over the otherwise uninterrupted planar top surface of support layer 204. Next, at block 406, a first layer of via opening fill material is deposited over the first mirror layer over the top surface including within and further partially filling the via opening. This is illustrated in FIG. 3A which shows a first BARC layer 210 applied over the mirror first metal layer 206. Then at block 408, as discussed above for first BARC layer 210, the first fill layer is cured. Following curing the first fill layer, one or more second fill layers are deposited over the first fill layer at block 408. This further fills the via opening to bring the level of the filler up to a level above the top surface of the first mirror layer. This is illustrated by the deposition of a second BARC layer 214 applied over the first BARC layer 210. Then at block 412, as discussed above for second BARC layer 214, the second fill layer is cured, which also serves as another cure for the first fill layer.

Next, at block 414, a patternable masking material is blanket deposited over the deposited fill layers and patterned, at block 416, to form a pillar mask. This is illustrated by the deposition and patterning of photoresist layer 216 in the above example, to create pillars 218 covering filled via opening 203 and extending for a lateral distance L beyond the top of opening 203 (see FIGS. 3C and 3D). The previously deposited first and second fill layers are then patterned using the pillar mask as a template at block 418, after which the masking material is removed at block 420. This is illustrated in FIG. 3E, wherein first and second BARC layers 210, 214 are etched using pillar 218 as a mask to form the raised protrusion with step height H and lateral width 222 of the fill material plug at the top of the opening 203.

Next at block 422, another fill layer is deposited over the patterned plug material top to fill any indentation remaining over the via opening, and then etched to remove an excess portion of the fill layer to planarize the plug top surface and to dull sedges left by the plug patterning. This is illustrated by the deposition of second sacrificial layer 224 over, and subsequent removal of excess portions from, the raised patterned portions of first and second fill layers 210, 214 over opening 203 shown in FIG. 3F.

Then, at block 424, the raised portion of the plug and any thinned portions of the fill layers left over the first mirror layer outside the plug region are removed, to planarize the top of the fill material plug even with the top surface of the first mirror layer. This is illustrated in the above example in FIG. 3G which shows the planarization of layers 210, 214 even with the top of the mirror first metal layer 206 using a timed plasma enhanced ash.

Thereafter, at block 426, layers 210, 214 are again cured and, at block 428, one or more second mirror layers are deposited over the first mirror layer and over the planarized fill material plug. This is illustrated in FIG. 3H by deposition of mirror second metal layer 228 over mirror first metal layer 206 and BARC layers 210, 214 after etchback of the plug. Following this, at block 430, the sacrificial material used to support the mirror formation is removed in a convenient later step, to free the mirror for movement atop the formed filled via support structure. This is normally done prior to completion of packaging, before or after singulation. This is illustrated in FIG. 3I which shows removal of first sacrificial layer 204 to release the mirror comprising metal layer stack 230 for operation.

The described methodology may offer many advantages.

Better planarization of the mirror in the vicinity of the via support may reduce the amount of scattering of incident light away from the intended "ON"/"OFF" reflection target paths. This may result in less light loss during the "ON" position and less light leakage during the "OFF" position, thereby improving overall achievable display contrast.

Better planarization may also offer greater flexibility for varying support configurations. Larger via support diameters and use of multiple via supports have historically typically introduced more scattering or more scattering locations. Improving planarization at such support sites may offer reconfiguration opportunities with less attendant increase in scattering.

The use of multiple fill layers that completely fill the via support opening may also offer opportunities for improved structural integrity and performance of the via structure itself. The use of BARC materials in contrast with photoresist, for example, may enable the deposition of thinner, more conformable layers. And, the BARC materials avoid the nitrogen outgassing issue associated with heating photoresist and, with multiple cures conducted prior to top metal layer application, may present fewer problems with contaminants overall. Multiple curings may also result in less risk of plug delamination between the plug and the mirror metal or the bond control structure (BCS).

Those skilled in the art to which the invention relates will appreciate that modifications may be made to the described example embodiments, and also that many other embodiments are possible, within the scope of the claimed invention.

What is claimed is:

1. A method of making a MEMS device, comprising:
   forming a via opening within a sacrificial support layer formed over a substrate;
   depositing a first member forming layer over the sacrificial support layer, including as a liner within and partially filling the via opening;
   depositing a first fill layer over the first member forming layer, including over the first member forming layer within and further partially filling the via opening;
   depositing a second fill layer over the first fill layer including within the via opening, the second fill layer filling the via opening to a level above a top surface of the first member forming layer;
   depositing a masking material over the second fill layer, and patterning the masking material to form a mask covering the filled via opening and extending for a given lateral distance beyond a top of the via opening;
   patterning the first and second fill layers using the mask to form a raised protrusion with a given step height and lateral width at the top of the via opening;
   removing the mask following the patterning of the first and second fill layers;
   depositing a third fill layer over the patterned first and second fill layers to fill an indentation in the raised protrusion;
   removing the raised protrusion to planarize a top surface of the filled via opening with the top surface of the first member forming layer; and
   depositing a second member forming layer over the first member forming layer and over the planarized top surface of the filled via opening.

2. The method of claim 1, further comprising, after depositing the second member forming layer, patterning the first and second member forming layers to form a member.

3. The method of claim 2, further comprising, after forming the member, removing the sacrificial support layer leaving the member supported above the substrate by the lined and filled via.

4. The method of claim 3, wherein the MEMS device comprises a micromirror device, and the member comprises a mirror.

5. The method of claim 4, wherein the first and second member forming layers comprise first and second metal layers.

6. The method of claim 1, further comprising curing the first and second fill layers prior to depositing the masking material over the second fill layer.

7. The method of claim 6, further comprising curing the first fill layer prior to depositing the second fill layer.

8. The method of claim 7, further comprising curing the first and second fill layers after planarizing the top surface of the raised protrusion.

9. The method of claim 1, wherein the first and second fill layers comprise layers of Bottom Anti-Reflective Coating (BARC) material.

10. The method of claim 9, wherein the third fill layer comprises a layer of BARC material.

11. The method of claim 1, wherein patterning the first and second fill layers patterns removes all of the second fill layer apart from the raised portion.

12. The method of claim 11, wherein patterning the first and second fill layers leaves a reduced thickness of the first fill layer over the first member forming layer apart from the raised portion.

13. The method of claim 12, wherein removing the raised protrusion includes removing the reduced thickness of the first fill layer.

14. A method of making a MEMS device, comprising:
forming a via opening within a sacrificial support layer formed over a substrate;
depositing a first metal layer over the sacrificial support layer, including as a liner within and partially filling the via opening;
depositing a first Bottom Anti-Reflective Coating (BARC) layer over the first metal layer, including over the first metal layer within and further partially filling the via opening;
curing the first BARC layer;
depositing a second BARC layer over the first metal layer including within the via opening, the second BARC layer filling the via opening to a level above a top surface of the first metal layer;
curing the second BARC layer;
depositing a masking material over the second BARC layer, and patterning the masking material to form a mask covering the filled via opening and extending for a given lateral distance beyond a top of the via opening;
patterning the first and second BARC layers using the mask to form a raised protrusion with a given step height and lateral width at the top of the via opening;
removing the mask following the patterning of the first and second BARC layers;
depositing a sacrificial fill layer over the patterned first and second BARC layers to fill an indentation in the raised protrusion;
after planarizing the filled indentation with the top surface of the raised protrusion, removing the raised protrusion to planarize a top surface of the filled via opening with the top surface of the first metal layer; and
depositing a second metal layer over the first metal layer and over the planarized top surface of the filled via opening.

15. The method of claim 14, further comprising, after depositing the second metal layer, removing the sacrificial support layer.

16. The method of claim 15, wherein the MEMS device comprises a micromirror, and further comprising patterning the first and second metal layers to form a mirror.

17. The method of claim 16, wherein the first BARC layer is cured prior to depositing the second BARC layer.

18. The method of claim 17, wherein the second BARC layer is cured prior to depositing the masking material.

19. The method of claim 18, further comprising again curing the first and second BARC layers after planarizing the top surface of the raised protrusion.

20. A MEMS device comprising a micromirror, the micromirror including:
a substrate;
a first metal layer;
a second metal layer;
a first Bottom Anti-Reflective Coating (BARC) layer; and
a second BARC layer;
the first metal layer, second metal layer, first BARC layer and second BARC layer defining a mirror supported in elevated position above the substrate by a via support; the first metal layer having a planar portion configuring a lower part of the mirror and also having a depending portion configuring supporting structure of the via support and having an opening; the first BARC layer being formed over the depending portion of the first metal layer and partially filling the opening; the second BARC layer being formed over the first BARC layer and filling a remainder of the opening; the first and second BARC layers being planarized at top surfaces with the first metal layer planar portion; and the second metal layer being formed over the planar part of the first metal layer and over the planarized top surfaces of the first and second BARC layers; the second metal layer configuring an upper part of the mirror.

* * * * *